Sept. 18, 1934. A. K. CROSS 1,973,921
COLOR FINDER AND METHOD FOR THE STUDY OF PAINTING
Filed March 2, 1933
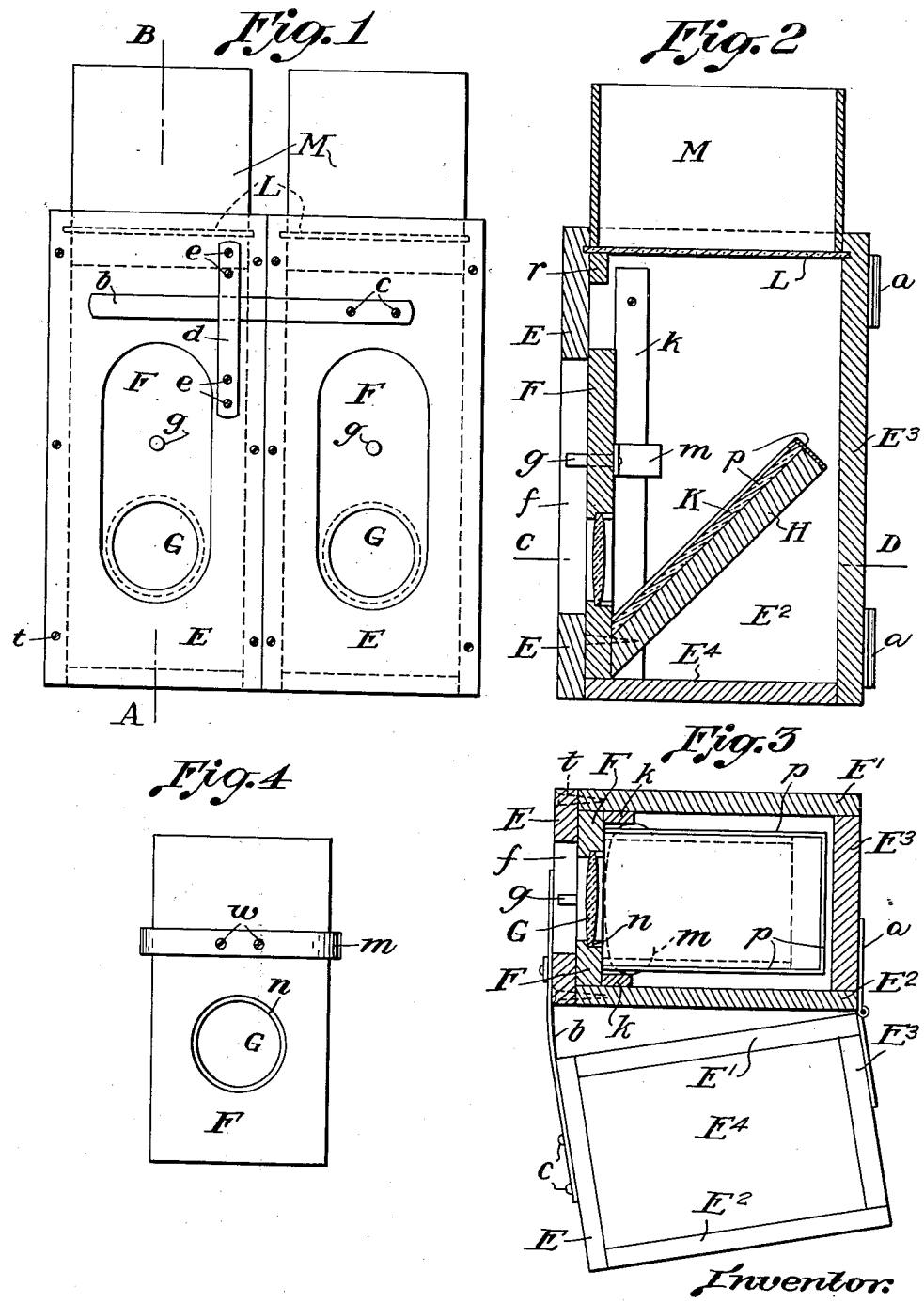
Inventor:
Anson K. Cross Patented Sept. 18, 1934

1,973,921

UNITED STATES PATENT OFFICE 1,973,921

COLOR FINDER AND METHOD FOR THE STUDY OF PAINTING

Anson K. Cross, Boothbay Harbor, Maine

Application March 2, 1933, Serial No. 659,341

9 Claims. (Cl. 88—24)

This invention is to perfect the methods for self-instruction in drawing and painting, for which Patents Nos. 491,160 and 1,387,439 were issued to me February 7, 1893 and August 9, 1921. It is not to supplant the inventions claimed in these patents but is to be used in connection with the inventions of both these patents to give a final and more accurate test of the finished painting than is possible by use of the earlier inventions.

This invention provides the third step in the process by which the student discovers his own mistakes with his own eyes quicker and better than when he relies on an instructor who does not use these vision-training devices.

The first step in this new process consists in the use of the method broadly claimed in the patent of 1893 for teaching freehand drawing in outline. By this method the drawing is made freehand without the customary pencil measurements and tests and without tracing or other aids until the drawing is as perfect as the eyes can see. The drawing is made with a special crayon on a tablet of clear window glass instead of on paper. A sheet of cardboard is behind the glass while the student is making the drawing in order that the student may not see objects behind the glass and may readily see the lines he makes on the glass. When the sketch is completed in outline only it is tested by withdrawing the card behind the glass and holding the glass up between the eye and the object so that the drawing appears to cover the object. A correct drawing will cover the object perfectly and failure of any lines to cover the corresponding lines of the object is instantly seen. The errors are corrected, not by tracing new lines, but by making new sketches until a drawing that covers perfectly is secured. This method produces such amazing results that efforts have continued to this time to find an equally effective way to enable a student to see values and color without the aid of an instructor.

On August 9, 1921 the patent on a drawing and painting glass was issued for a new method of correcting paintings by use of two lenses. One of these lenses produces a blurred image of the object and the other a blurred image of the student's painting of this object.

These images are compared by looking at the lenses as if the images were painted on the lenses and there was nothing behind the lenses. By this simple means students gain the blurred vision for effects and masses that Sir Joshua Reynolds said is the essential for success. These lenses enable students who use them properly to gain in months what they have often failed to gain in years by old methods of study.

To gain the true vision for values and color that distinguishes the work of the great painters from that of the student or amateur is such a difficult problem that even the best painters failed to realize the value of Vermeer's paintings for hundreds of years while the average painter, the student, the amateur and the public always see with the natural vision of the scientist that studies details one by one and never sees transient effects of color or of light and shape.

Seeing, for all except the few who have gained the painter's vision, is more an act of the mind than of the eye for the untrained eye sees the facts that the mind knows. By usual methods it takes talented art students a score of years to learn to see apparent colors instead of the local colors of the objects.

For this reason some students fail to use the lenses properly to see apparent colors on their surfaces instead of the actual colors on the objects behind the lenses. They look through the lenses and see facts while they think they are looking at the lenses. This happens because by usual methods the student compares his painting which has two dimensions with his model which has three dimensions. To reduce three dimensions to their appearance on a plane is so difficult that most students never succeed in seeing appearances on a picture plane even when the painting is life-size and the picture plane as far away as the model.

Students who cannot paint from nature often have little difficulty in copying paintings that others have produced because the comparisons are on the two dimensions of a plane surface both for the painting and the copy. Since it is comparatively easy to copy a picture it should be as easy to paint from nature if a way can be found by which the student compares an image of his model or still-life subject with an image of his painting and is not influenced by seeing the actual subject when he compares the two images.

To produce images of the object and the painting of the object two cameras may be used, one to image the object and the other to image the painting. A photographer will readily compare the two images on the ground glass screens of the cameras and see how the image of the painting differs in light and color from the image of the object.

The images on the ground glass of the camera are inverted and difficult to compare. In order that the student and amateur may see and compare the two images readily they should be upright. To obtain upright images I employ two boxes each containing a lens, a mirror at an angle of 45 degrees with the lens and a screen of ground glass at right angles to the plane of the lens and at 45 degrees to the plane of the mirror. Means for focussing the image are provided, also means for shading the ground glass from light that will weaken the image. The two boxes are hinged together so that one may be pointed at the model and the other at the painting. This invention enables students to forget the facts of color and see color appearances on the picture plane of the ground glass.

The student who has made and tested a drawing by the method of the earliest patent, and who has then made a painting by reproducing the colors seen by use of the lenses of the patent of 1921, finally tests the painting by comparing an image of the painting produced on one of the finders with an image of the model produced on the other finder. He quickly sees differences in light or in color and corrects his painting by changing it until it will produce an image that is like that made by his model. When comparing the details of his painting both images should be in sharp focus. When comparing the masses of light and dark and color to see the effect of his painting both images should be equally blurred.

It is necessary to use the inventions of the earlier patents before using the device shown in this application, because the ground glass cuts out some of the light and some of the color. It gives, however, enough of both light and color to enable the student to see wherein his painting lacks the light and color of nature and it teaches him to see on a picture plane that is near at hand, so that in a short time he can use the lenses properly to see all of the light and color that they reveal.

Though this camera finder is the only speedy means to true vision for many students it cannot be used while the student is painting as successfully as the lenses, because it is too heavy to be held in one hand and because it does not show all the light and color of the object. The lenses can be held in one hand so that the student sees the effect of his subject on one lens and the effect of his painting on the other lens. They may be thus held during the entire period of the sketch. The camera finder is, however, necessary after the painting has been completed by use of the lenses. In this final test the loss of some light and some color is an advantage, for any lack of contrast of light and dark and color in the sketch is more readily seen when the light is diminished.

Students who use all of these inventions properly soon become able to draw and paint by vision and feeling, discarding the customary measures and tests. After a few months of practice their eyes will be truer than any tests and the frequent use of all these inventions will generally become unnecessary.

To enable all students in public, elementary and art schools, and all art lovers in their own homes to profit by this method the simplest possible mechanism should be provided in order that drawing and painting may become a fourth R, to make life more beautiful and spiritual for all, art expression more natural and effective for the born artist and the products of all our factories more saleable, because art training insures better workmen for all industries and greater beauty in all manufactured articles.

I attain these objects by the mechanism illustrated in the accompanying drawing, in which Figure 1 is a front view of the entire device; Figure 2 is a vertical section through one finder on the line A—B; Figure 3 is a bottom view of both finders, one finder being shown in section on line C—D, except that the sliding part holding the mirror is not shown in section; Figure 4 shows the vertical sliding part holding the lens in elevation as seen from the right of Figure 2. Similar letters refer to similar parts throughout the several views.

This finder consists of two equal boxes or cases each adapted to hold a lens, a mirror and a ground glass screen. The boxes are hinged together by hinges at the rear sides so that one box may be directed at the model and the other at the painting. On the front of one box a flexible friction band $b$ is secured by means of screws $c$. This band passes under a spring strap $d$ which is secured by screws $e$ to the other box. The tension of the spring $d$ may be adjusted by the screws $e$ to create any desired amount of friction to hold the two boxes at the desired angle. These boxes are made of five pieces of wood or other suitable material, $E$, $E^1$, $E^2$, $E^3$, $E^4$. They are securely fastened together by glue and brads except the front $E$ which is secured to the sides of the boxes by screws $t$.

The ground glass L is inserted in grooves cut in the sides of the box. The front of the box is removeable so that a broken ground glass may be readily replaced, and also to permit the mirror K and the inner surface of the lens G to be cleaned. The lens G is inserted in a slide which is moveable vertically between the front of the box E and cleats $k$ that are fastened to the inner surfaces of the sides of the box.

The mirror K is supported by the piece H which is at an angle of 45 degrees with F and is fastened by screws to the slide F. The lens G is held in place by a ring $n$ and the mirror is held upon the plate H by angle strips $p$ of metal which are fastened to the edges of the plate H.

The slide F is moved up or down to focus the lens for a sharp or a clear image on the ground glass by the pin $g$. The slide is held in position by the spring $m$ which is secured to the slide by screws $w$. A cleat $r$ is fastened to the top of E to prevent the slide F from striking the ground glass.

To protect the ground glass from light outside the finder a tube M extends to any desired distance above the ground glass. The inside of the box and all wood and metal parts within the box and also the inside surface of the tube M above the box should be painted or stained a dead black. The box and its sliding parts may be made of metal or composition and the construction may be changed materially without departure from this invention.

Instead of separate boxes hinged together one larger box may be used and the lenses and mirrors adapted to swing about pivots, so that the images will be produced upon one piece of ground glass. Instead of ground glass an opaque white screen can be used and lenses and mirrors arranged to project images of the object and the painting upon this screen, which will not reduce the light and color of the images. This construction will be large and very expensive and no better for visual training purposes than the use of the blurring lens while painting and the use of this finder to correct the finished sketch.

The purpose of this invention is not a mechanical aid to be always used in the making of pictures, for worth while results can never come as long as measures, tests and mechanical aids must be used. Good painting requires a truth of vision that discards all aids and allows free expression. This invention is designed to develop a truth of vision that will soon discard all aids. The light and color lost by use of the ground glass do not lessen the value of the invention, which is intended to be used to compare the image of the painting with the image of the object, for both images lose light equally and when they are alike the painting must be true to nature.

I claim:

1. In a camera for artists' use a camera for projecting an upright image of a distant object upon a screen of translucent material, and a similar camera pivotally connected to the first camera for projecting an upright image of a painting of the object upon an adjacent screen of translucent material on the same plane as the first screen, in order that the two images may be readily compared.

2. In a camera for artists' use two cameras adjustably connected and having their respective translucent screens adjacent to each other whereby the projected images may be relatively compared so that one may be directed at an object at the left of the camera and the other at a painting of the object at the right of the camera, a lens in the front of each camera, a mirror at an angle of 45° with the lens and the top of each camera, and a translucent screen in the top of each camera to receive the image projected by the lens and reflected by the mirror.

3. In a camera for artists' use two cameras hinged together at their rear edges and having their respective translucent screens adjacent to each other whereby the projected images may be relatively compared so that they may be pointed at an object and a painting of the object in an angular field of 90°, a lens in the front of each camera, a mirror within each camera at an angle of 45° with the lens and the top of the camera, a translucent screen in the top of each camera and means for focussing the image projected by the lens through vertical motion of the lens and the mirror.

4. In a camera for artists' use two equal cameras adjustably connected and having their respective translucent screens adjacent to each other whereby the projected images may be relatively compared, to point in different directions at an object and a painting of the object, a lens adapted to slide in the front of each camera, a mirror behind each lens at an angle of 45° with it, means for moving the lens and the mirror, means for holding the lens and mirror at any desired distance from the top of the camera and a translucent screen in the top of each camera to produce an upright image projected by the lens and reflected by the mirror.

5. In a camera for artists' use two cameras adjustably connected and having their respective translucent screens adjacent to each other whereby the projected images may be relatively compared so that they may be pointed at different objects as an object and a painting of the object, a lens and a mirror attached to a slide adapted to vertical motion in the front of each camera, means to move the slide, means to hold the slide at any desired level, a translucent screen to receive the projected image in the top of each camera and means to prevent light external to the camera from falling on the screen.

6. In a camera for artists' use two cameras hinged together at their rear edges and having their respective translucent screens adjacent to each other whereby the projected images may be relatively compared so that they may be pointed at different objects as an object and a painting of the object within an angular field of 90°, means to hold the two cameras at any desired angle with each other, a slide adapted to hold a lens at the front of each camera and a mirror at an angle of 45° behind each lens, means to move the slides for focussing the lenses, means to hold the slides at any desired position and a translucent screen to receive the projected image in the top of each camera.

7. In a camera for artists' use in the study of values and color two equal cameras hinged together and having their respective translucent screens adjacent to each other whereby the projected images may be relatively compared, means for holding them at any desired angle with each other so that they may be pointed at an object and a painting of the object, a slide adapted to vertical motion in the front of each camera, a lens in each slide, a mirror secured to each slide at an angle of 45°, means to move the slide, means to hold the slide at any desired position, a translucent screen to receive the projected image in the top of each camera and means to prevent light external to the camera from falling on the screen.

8. A new method for art study consisting of drawing freehand, without any measurements, tests or theories, on a transparent tablet when an opaque screen is behind the tablet, testing and then correcting this drawing by removing the screen and viewing the object through the drawing on the transparent tablet to discover and correct the errors shown by failure of the lines of the drawing to appear to cover those of the object behind the drawing, painting the corrected drawing by reproducing from memory while painting from the object the colors imaged upon the ground glass of one camera and correcting the painting by painting or repainting from the object until it will produce the same image on one camera that the object produces on the other camera.

9. A new method for the study of painting in which the object is observed through a blurring lens while the painting is seen through a second and equal blurring lens, the observing and the painting by continued and uninterrupted use of both lenses, continuing until the blurred image of the painting seems to reproduce exactly the colors and values of the blurred image of the object as seen on the other lens, when the final test is then applied of comparing an image of the object produced on the ground glass of one camera with an adjacent image of the painting produced on the ground glass screen of another camera pivotally connected to the first camera so that the two screens are in the same plane in order that differences in the two images may be seen and the painting corrected until its image equals in every respect that produced by the object.

ANSON K. CROSS.